United States Patent [19]
Fujii et al.

[11] 3,785,859
[45] Jan. 15, 1974

[54] METHOD FOR FLAMEPROOFING FIBERS
[75] Inventors: Hajime Fujii; Tatsuo Hattori, both of Shin Nanyo, Japan
[73] Assignee: Toyo Soda Manufacturing Co., Ltd., Yamaguchi, Japan
[22] Filed: Dec. 29, 1971
[21] Appl. No.: 213,537

[30] Foreign Application Priority Data
Dec. 29, 1970 Japan.............................. 45-121416
Dec. 30, 1970 Japan.............................. 45-122090

[52] U.S. Cl........ 117/136, 117/138.8 B, 117/139.4, 117/141, 117/142, 117/143 R, 117/144, 260/239 EP
[51] Int. Cl............................................. C09d 1/00
[58] Field of Search................... 117/136, 141, 142, 117/143 R, 144, 139.4, 138.8 B; 8/116.2, 8/116 P, 191; 260/239 EP

[56] References Cited
UNITED STATES PATENTS
2,891,877   6/1959   Chance et al...................... 117/136

Primary Examiner—William D. Martin
Assistant Examiner—Theodore G. Davis
Attorney—Norman F. Oblon et al.

[57] ABSTRACT

Natural or synthetic fibers are flame-proofed by treatment with an aziridinyl phosphine oxide compound containing an halogen and an acid curing catalyst which is cured to fix the aziridinyl phosphine oxide compound to the fiber.

12 Claims, No Drawings

METHOD FOR FLAMEPROOFING FIBERS

BACKGROUND OF THE INVENTION

1. Field Of The Invention

This invention relates to a method for flameproofing fibers using a reaction type flameproofing agent.

2. Description Of The Prior Art

Conventional flame-proofing agents include tetrakis-hydroxymethyl-phosphonium chloride (THPC), tetrakis-hydroxymethyl-phosphonium hydroxide (THPOH), tris (1-aziridinyl)phosphine oxide (APO), phosphonyl amide (a white powder prepared by contacting ammonia with phosphorus oxychloride), or phosphonoalkyl amide. The flame-proofing activity of these compounds is generally attributable to the phosphor or phosphor and nitrogen and accordingly a relatively large quantity of the flame-proofing agent is required based on the weight of the fabric. For instance, quantities as large as 15–30 parts of flame-proofing agent per 100 parts by weight fabric have been required to provide adequate flame-proofing effects.

Another difficulty has been the necessity of using a fiber treating composition, usually containing a melamine resin, urea resin, or thiourea resin, with the flame-proofing agent to effectively fix the flame-proofing agent to the fibers. However, the combination of the large quantity of flame-proofing agent and the fiber treating composition, can act to severely diminish the physical properties of the fibers, including their tear strength and their tensile strength.

Often the conventional flame-proofing agent is used in combination with a synergist, such as tris (2,3-dibromopropyl)phosphate, tris (1,3-dichloroisopropyl)phosphate, tris (2,3-dichloropropyl)phosphate, tris ($\beta$-bromoethyl)phosphate, or tris ($\beta$-chloropropyl) phosphate. This combination often results in excellent flame-proofing effects, usually resulting from the interaction of the halogen radical and the phosphor film-forming mechanism, as disclosed in *Textile Research Journal* 38, 273 (1968). However, such conventional combinations do not possess reactive groups which are reactive with the fibers or which are polycondensable with the fibers, so they do not possess good resistance to washing or dry-cleaning.

SUMMARY OF THE INVENTION

Accordingly, it is one object of this invention to provide a method using flame-proofing agents which will not adversely affect the physical properties of the fiber, including its tensile or tear strengths.

It is another specific object of this invention to provide a method using a flame-proofing agent which will not adversely affect the feel or color tone of the fibers treated.

A further object of this invention is to provide a method using a flame-proofing agent which can be used in relatively small quantities.

A still further object of this invention is to provide a method using a flame-proofing agent which will impart semi-permanent wash resistance and dry-cleaning resistance to the fibers.

These and other objects, as will hereinafter become more apparent, have been achieved by use of an aziridinyl phosphine oxide as a flame-proofing agent.

DETAILED DESCRIPTION OF THE PREFERRED EMBODIMENTS

The aziridinyl phosphine oxide used herein should have one of the following structures:

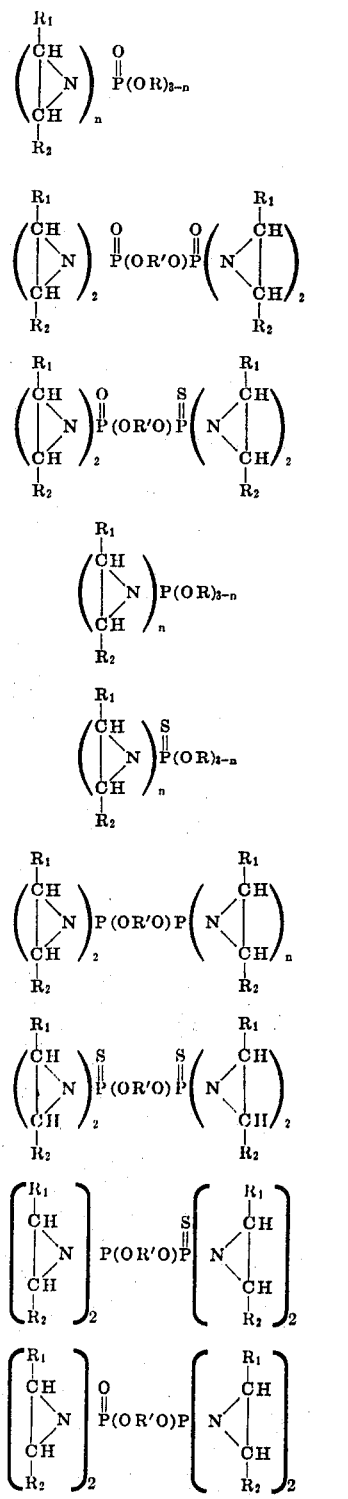

wherein R represents a halogenoalkyl group or a sodium sulfonate substituted halogenoalkyl group and R' represents a halogenoalkylene group or a sodium sulfonate substituted halogenoalkyl group, and $R_1$ and $R_2$ are the same or different and each respectively represent hydrogen or an alkyl group and $n$ represents an integer of 1 or 2.

Suitable halogens for the halogenoalkyl or halogenoalkylene groups are chlorine or bromine. The halogenoalkyl group may preferably contain two to three carbon atoms, and the halogenoalkylene group may preferably contain one to four carbon atoms.

These compounds as a class are not novel compounds per se, but their use as flame-proofing agents for fibers is novel. For instance:

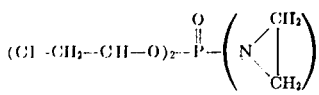

is described in *Chemical Abstracts* 68, 29,491a (1968), and

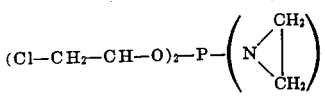

is described in *Chemical Abstracts* 55, 1,564 b.

Among the suitable reactive type aziridinyl phosphine oxide compounds used for the methods of this invention may be mentioned:

[1] 

[2] 

[3] 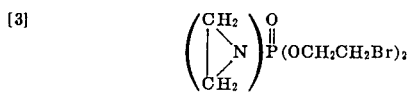

[4] 

[5] 

[6] 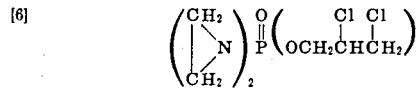

[7] 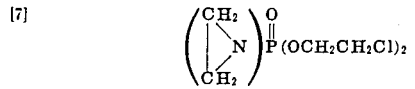

[8] 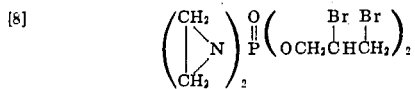

[9] 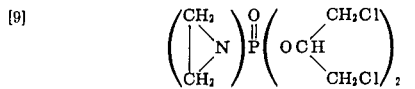

[10] 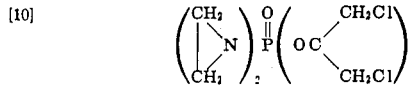

[11] 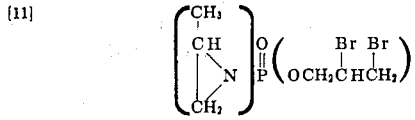

[12] 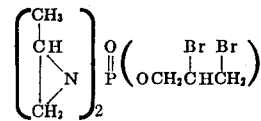

[13] 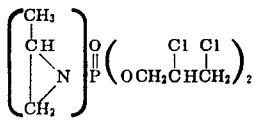

[14] 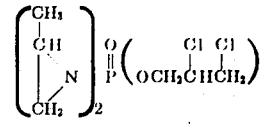

[15] 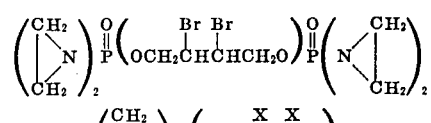

[16] 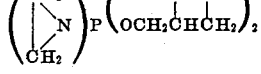

[17] 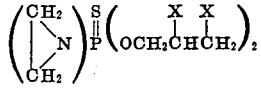

[18] 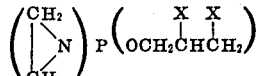

[19] 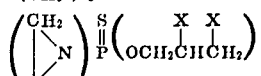

[20] 

[21] 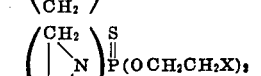

[22] 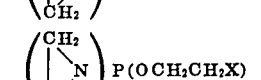

[23] 

[24] 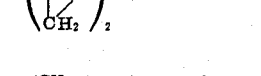

[25] 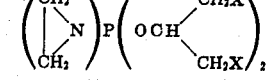

[26] 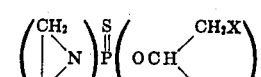

[27] 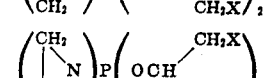

[28] 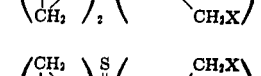

[29] 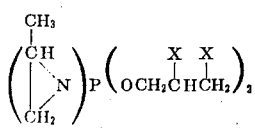

[30] 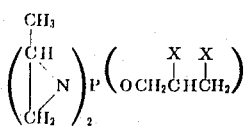

[31] 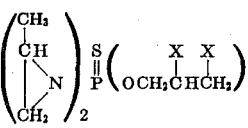

[32] 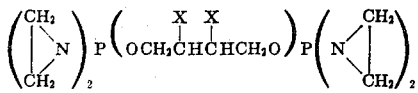

[33] 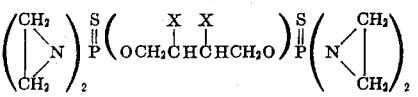

[34] 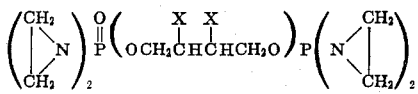

[35] 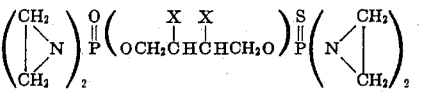

[36] 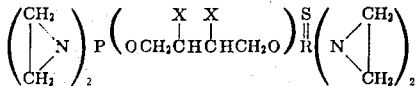

wherein X represents a chlorine or bromine atom. (Hereinafter, these compounds will be referred to by number and the definition of X as X=Cl or X = Br.)

These compounds can be used by being dissolved in an organic solvent, by emulsifying, or by solubilizing with a surface active agent.

Where the compounds are used as an aqueous solution without a surface active agent, a portion of the halogen atoms of these compounds should be substituted with a sodium sulfonate group by reacting with $Na_2SO_3$. For instance, such substituted substituents of the compound [1] would be as follows:

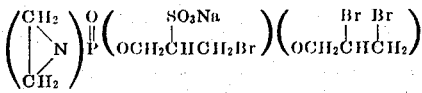

or

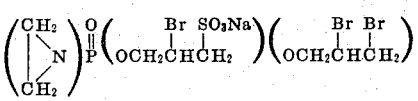

(Hereinafter, those compounds having substituted sodium sulfonate groups will be referred to by compound number and number of substituent groups. For instance, [1]-2S will refer to compound [1] having two sodium sulfonate groups.)

The aziridinyl groups of these compounds are bonded to reactive groups of the fibers, or are self-polymerized to form a water and organic solvent insoluble material on the fibers, when the compounds are cured in the presence of an acidic catalyst, e.g., ammonium chloride, ammonium hydrogen phosphate, ammonium dihydrogen phosphate, ammonium borofluoride, zinc borofluoride, or zinc nitrate. The resulting material provides excellent semipermanent wash resistance, dry-cleaning resistance, and flame-proofing effects.

These compounds may be applied to a wide variety of natural or synthetic fibers including cotton, hemp, silk, wool, polyester, polyacrylonitrile, polyamide, rayon, polyvinylchloride, or polyvinylidenechloride. It may also be applied to paper, wood, etc. Where any hydroxy group containing cotton is used, the wrinkle resistance, shrink resistance and wash and wear properties of the treated cotton will be improved and moreover, the compounds used herein will impart improved antiseptic and fungicidal properties by cross-linking between the aziridinyl groups and cellulose groups of the cotton.

Since halogen containing phosphorus compounds are generally water-insoluble, it is necessary to consider the medium used for applying these compounds. Water may be used. However, it is necessary to emulsify the compound or to solubilize it by use of a suitable surface active agent. Emulsification is enhanced if a portion of the halogen atoms in the flame-proofing agent is substituted with sodium sulfonate groups. In this instance, even though the halogen is decreased, the sulfonate groups also possess some degree of flame-proofing effect, so that excellent flame-proofing effect are still attained.

Various organic solvents may be used to prepare a suitable treating solution; for instance, such solvents as methanol, ethanol, or N,N'-dimethylformamide (DMF), etc.

The curing catalyst may be a conventional acidic catalyst which is used in amounts of 1 – 20 percent by weight based on the weight of the flame-proofing agent. The catalyst concentration is preferably in the range of 1 – 30 g/l, especially 2 – 20 g/l. The temperature of the treating bath should preferably be in the range of 0° – 60°C. and more preferably 0° – 30°C. The wet pick-up is preferably 50 – 98 wt. %, especially 60 – 90 wt. %. The drying temperature should preferably be from 30° to 150°C, particularly 60° – 100°C.

Relatively low curing temperatures can be used as compared with conventional Pad-Dry-Cure Processes, and is preferably in the range of 50° – 150°C, particularly 60° – 120°C. This has the important advantage that no poisonous gas will be generated in contrast to conventional systems such as when using THPOH, THPC, phosphonoalkylamide or APO, wherein formaline or hydrochloride gas is generated during condensation, or phosphine gas is generated during curing. Where a surface active agent is used, the amount of surface active agent is usually in the range of 1 – 20 wt. %, preferably 1 – 15 wt.%. The concentration of flame-proofing agent in the solvent or water is preferably 5 – 60 wt.%, and particularly 5 – 50 wt. %.

As a typical example of use, 8– 10 parts by weight of the flame-proofing agent per 100 parts of cotton cloth were applied. The treated fabric was then dried at 80°C. for 1 – 5 minutes and cured at 90° – 160°C. for 2 – 20 minutes, and then soaped to bond. The fabric had a wash resistance, dry-cleaning resistance and flame-proofing effects sufficient to pass the test of JISA 8952–1970. The flameproofing effects of the method of this invention are remarkably higher than those attainable by conventional methods using THPC, THPOH, APO or N-hydroxymethyl-3-(dimethylphosphonopropionamide), and the wash resistance and dry-cleaning resistance effects of the method of this invention are significantly higher than those of conventional methods.

Having generally described the invention, a more complete understanding can be attained by reference to certain specific examples, which are included herein for purposes of illustration only and are not intended to be limiting unless otherwise specified.

Preparation of the aziridinyl phosphine oxide compound

Two examples of preparation of the aziridinyl phosphine oxide compounds will now be described:

1.
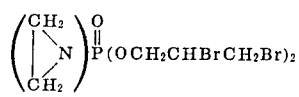

To a mixture of 38.3 g. (0.25 mole) of $POCl_3$ and 112 g. (0.75 mole) of N,N-diethylaniline (as hydrochloride removing agent) in 100 ml. of methylenechloride, 10.8 g. (0.25 mole) of ethyleneimine was added dropwise at 20° – 30°C. for 15 minutes, and then 109 g (0.5 mole) of 2,3-dibromo-1-propanol was added dropwise at 20° – 30°C. for 30 minutes, while stirring. The reaction product was washed with 250 ml. of water to remove N,N-diethylaniline hydrochloride, and methylene chloride was stripped at 40°C. for 1 hour under reduced pressure, to yield 120 g. of a pale yellow viscous liquid product having the following properties:

P content   5.84%
Br content  61.07%
specific gravity   2.030 (20°C.)
infrared spectrum (NACl plate)   $820^{cm-1}$ based on aziridinyl ring Instead of using methylene chloride, other inert solvents such as $CCl_4$, $CHCl_3$, $(C_2H_5)_2O$, $CH_3COOC_2H_5$, benzene or toluene can be used. Instead of the N,N-diethylaniline, other hydrochloride removing agents, such as pyridine, triethylamine, N,N-diethylaniline or picoline can be used.

It is also possible to add dropwise, 2,3-dibromo-1 propanol and then to add ethyleneimine dropwise.

It is also possible to add dropwise a mixture of 0.5 mole of 2,3-dibromo-1-propanol and 0.5 mole of N,N-diethylaniline and then to add dropwise a mixture of 0.25 mole of ethyleneimine and 0.25 mole of N,N'-diethylaniline or in counter order.

It is also possible to add 0.5 mole of 2,3-dibromopropanol, and to add dropwise 0.5 mole of N,N'-diethylaniline and to add dropwise a mixture of 0.25 mole of ethyleneimine and 0.25 mole of N,N-diethylaniline.

2.
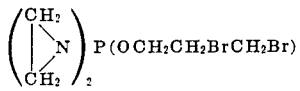

A mixture of 435.8 g. (2 mole) of 2,3-dibromo-1-propanol, 202.4 g. (2 mole) of triethylamine in 400 ml. of methylenechloride was added dropwise to 274.6 g. (2 mole) OF $PCl_3$ in 800 ml. of methylenechloride at −5°C.-5°C. while stirring. 177.2 g. (4 mole) of ethyleneamine and 404.8 g. (4 mole) of triethylamine were further added dropwise to said mixture for 2.5 hours.

After the reaction, the reaction product was washed with 700 ml. of water to remove triethylamine hydrochloride, and then methylenechloride was stripped at 40°C. for 1 hour under a reduced pressure using a rotary evaporator, to yield 597.8 g. of pale yellow viscous liquid, having the following properties:

P content   9.60%
Br content  50.3%
infrared spectrum   $795^{cm-1}$ based on aziridinyl ring
specific gravity   1.841 (20°C.)

The solvent, hydrochloride removing agent and method of addition can be modified, as stated above.

EXAMPLES 1 through 22

The above-mentioned compounds [1] through [26] were dissolved in organic solvents, as shown in Table I, and then curing catalysts, as shown in Table I, were added to prepare suitable immersing solutions. Treatable textiles were immersed in the solutions to attain a 60 to 80 percent pick-up. These textiles were dried at 80°C. for 5 minutes, and then cured at 110°C. for 5 minutes. They were then soaped using an aqueous solution containing 0.25 weight percent of $Na_2CO_3$ and 0.25 weight percent of Nissan Maruseru Soap, a product of Nippon Oils and Fats Co., Ltd., while agitating the aqueous solution vigorously at a temperature of 90°C. and a bath ratio of 50 for 20 minutes. Subsequently, the textiles were rinsed with water at 40°C and a bath ratio of 100 for 15 minutes.

One group of the treated textiles were continuously cleaned for twenty times using the above-mentioned soaping and rinsing processes. A second group of textiles were treated by dry-cleaning procedures, twenty times, using 1,1,2,2-tetrachloroethylene at 50°C. and a bath ratio of 50 while agitating vigorously for 20 minutes.

The textiles in both groups were dried and tested by the flame-proofing testing method, JIS (Japanese Industrial Standard) -A-8952,1970.

The following notes apply to all of the following tables:

[1]In accordance with Japanese Industrial Standard JIS-A-8952/1970, the test sample is a small thickness fabric having a maximum weight of 450 g. per square meter of fabric area; the afterflame is 3 seconds or less; the residual ignited ash time is 5 seconds or less; the carbonized area is 30 cm² or less and the frequency of flame contact is 3 times or more. Tests for flame contact frequency are omitted for fabrics which do not form a molten state when contacted with a flame.

[2]The rate of adhesion of the flame-resistant agent is stipulated as 10 percent, if 10 weight parts of the said agent is adhered to 100 weight parts of untreated fabric. The pick-up rate is stipulated as 70 percent, if 70 weight parts of immersing solution is impregnated into 100 weight parts of untreated fabric.

[3]Tear strength is tested by a Pendulum process using an Ermondorf Testing Machine. The tear strength is measured after finishing, curing, soaping and rinsing, and the test results are compared with the tear strength of the corresponding untreated textiles.

[4]Tensile strength is tested in accordance with the Grab process stipulated by JIS (Japanese Industrial Standard)-L1068/1964 (Testing method for tensile strength of textile) and its measurement is performed after finishing, curing, soaping, and rinsing. These test results are compared with those obtained with corresponding untreated textiles.

[5]Dry-wrinkle resistance (W+F) is tested in accordance with the Monsanto process and measurements are then made after finishing, curing, soaping and rinsing. These test results were also compared with those obtained using the corresponding untreated textiles.

[6]W in the said formula means longitudinal shrinkage and F means a transversal shrinkage.

EXAMPLES 23 THROUGH 44

Compounds [1] through [16] were emulsified as O/W type emulsions, or solubilized by mixing 10 weight

TABLE I

Test of Flame Resistance on Flame-Proofing Treatment of (Organic Solvent) JISA-8952-1970

| Experiment | Fabric (weight/area) (g/m²) | Solution | | | Pickup[2] (%) |
|---|---|---|---|---|---|
| | | Flame-proofing agent (g/l) | Curing catalyst (g/l) | Solvent | |
| 1 | Cotton (240.5) | [1] (150) | $Zn(BF_4)_2$ (5) | methanol | 74.5 |
| 2 | Cotton (240.5) | [2] (150) | $Zn(BF_4)_2$ (5) | methanol | 75.3 |
| 3 | Hemp (265.4) | [1] (150) | $Zn(BF_4)_2$ (5) | DMF | 77.6 |
| 4 | Cotton (240.5) | [3] (150) | $Zn(BF_4)_2$ (5) | methanol | 73.1 |
| 5 | Cotton (240.5) | [4] (150) | $NH_4Cl$ (2.5) | DMF | 74.6 |
| 6 | Cotton (240.5) | [5] (150) | $NH_4Cl$ (2.5) | methanol | 72.9 |
| 7 | Polyamide (175.0) | [6] (150) | $Zn(BF_4)_2$ (5) | methanol | 76.5 |
| 8 | Polyacrylonitrile (232.3) | [7] (150) | $NH_4BF_4$ (5) | methanol | 79.8 |
| 9 | Cotton (240.5) | [8] (150) | $Zn(BF_4)_2$ (10) | methanol | 73.2 |
| 10 | Wool (160.3) | [9] (150) | $Zn(BF_4)_2$ (5) | methanol | 70.6 |
| 11 | Polyvinylalcohol (220.5) | [10] (150) | $Zn(BF_4)_2$ (5) | methanol | 78.3 |
| 12 | Cotton (240.5) | [11] (150) | $NH_4H_2PO_4$ | methanol | 74.5 |
| 13 | Rayon (Cu-ammonium) (133.0) | [12] (180) | $Zn(BF_4)_2$ (5) | DMF | 79.3 |
| 14 | Cotton (240.5) | [13] (150) | $(NH_4)_2HPO_4$ (5) | ethanol | 72.4 |
| 15 | Cotton (240.5) | [14] (150) | $(NH_4)_2HPO_4$ (5) | methanol | 73.8 |
| 16 | Silk (148.0) | [15] (150) | $(NH_4)_2HPO_4$ (5) | methanol | 76.2 |
| 17 | Cotton (240.5) | [16] (150) | $(NH_4)_2HPO_4$ (5) | methanol | 79.3 |
| 18 | Cotton (240.5) | [1] (75) [9] (75) | $Zn(BF_4)_2$ (5) | methanol | 72.1 |
| 19 | Cotton (240.5) | [2] (75) [9] (75) | $Zn(BF_4)_2$ (5) | DMF | 78.3 |
| 20 | Wool (160.3) | [1] (75) [2] (75) | $NH_4H_2PO_4$ (10) | ethanol | 72.9 |
| 21 | Polyamide (175.0) | [4] (80) [6] (80) | $Zn(NO_3)_2$ (5) | methanol | 74.5 |
| 22 | Rayon (Cu-ammonium) (133.0) | [12] (75) [10] (75) | $Zn(BF_4)_2$ (5) | methanol | 76.1 |

| Experiment | Rate of Add-on[2] after curing, soaping, rinsing (%) | Flame resistance after 20 times continuous washing[1] | | | | |
|---|---|---|---|---|---|---|
| | | Remainder[2] (%) | After flame period (sec.) | After glow period (sec.) | Carbonized area (Char area) (cm²) | Number of flame treatments |
| 1 | 8.8 | 7.4 | 2.7 | 4.6 | 26.8 | — |
| 2 | 8.6 | 8.2 | 2.6 | 4.6 | 26.1 | — |
| 3 | 8.5 | 7.6 | 2.9 | 4.5 | 28.9 | — |
| 4 | 8.7 | 7.9 | 2.7 | 4.3 | 25.4 | — |
| 5 | 9.2 | 8.4 | 2.2 | 4.7 | 23.9 | — |
| 6 | 8.6 | 8.3 | 2.4 | 4.8 | 26.5 | — |
| 7 | 9.2 | 7.6 | 2.7 | 4.5 | 28.6 | 4 |
| 8 | 9.1 | 8.2 | 2.5 | 4.5 | 24.3 | 4 |
| 9 | 8.8 | 7.9 | 2.9 | 4.8 | 29.3 | — |
| 10 | 8.6 | 8.1 | 2.7 | 4.4 | 27.6 | — |
| 11 | 9.1 | 7.4 | 2.8 | 4.3 | 29.4 | 5 |
| 12 | 8.9 | 8.3 | 2.3 | 4.2 | 24.2 | — |
| 13 | 8.4 | 7.9 | 2.9 | 4.9 | 26.0 | — |
| 14 | 9.4 | 8.6 | 2.3 | 4.2 | 25.4 | — |
| 15 | 8.8 | 8.0 | 2.8 | 4.6 | 28.1 | — |
| 16 | 8.9 | 7.5 | 2.9 | 4.8 | 28.9 | 4 |
| 17 | 9.4 | 8.3 | 2.6 | 4.7 | 26.3 | — |
| 18 | 8.7 | 7.9 | 2.7 | 4.8 | 27.0 | — |
| 19 | 9.3 | 7.6 | 2.9 | 4.5 | 28.4 | — |
| 20 | 9.2 | 8.4 | 2.9 | 4.7 | 26.3 | — |
| 21 | 9.6 | 7.3 | 2.6 | 4.4 | 29.0 | 4 |
| 22 | 9.1 | 7.9 | 2.8 | 4.8 | 27.6 | — |

| Experiment | Flame resistance after 20 times of continuous dry-cleaning[1] | | | | | NOTE | | |
|---|---|---|---|---|---|---|---|---|
| | Remainder[2] (%) | After flame period (sec.) | After glow period (sec.) | Carbonized area (Char area) (cm²) | Times contacting to flame | | | |
| 1 | 7.6 | 2.6 | 4.4 | 28.4 | — | [3]tear strength, (F) 21% decrease | [4]tensile strength, (F) 3.4% decrease | [5]dry wrinkle resistance (W+F) 64% increase |
| 2 | 8.1 | 2.6 | 4.6 | 25.4 | — | | | |
| 3 | 7.8 | 2.8 | 4.7 | 29.3 | — | | | |
| 4 | 7.5 | 2.9 | 4.9 | 29.8 | — | | | |
| 5 | 8.4 | 2.4 | 4.8 | 28.6 | — | | | |
| 6 | 8.1 | 2.6 | 4.8 | 27.7 | — | | | |
| 7 | 7.7 | 2.7 | 4.7 | 29.3 | 4 | [3]tear strength, (F) 24% decrease | [4]tensile strength, (F) 2.9% decrease | [5]dry wrinkle (W+F) 50% increase |
| 8 | 7.9 | 2.8 | 4.9 | 28.5 | 4 | | | |
| 9 | 8.0 | 2.9 | 4.8 | 27.0 | — | | | |
| 10 | 7.9 | 2.9 | 4.9 | 29.1 | — | | | |
| 11 | 7.4 | 2.9 | 4.6 | 28.7 | 5 | | | |

| Experiment | Flame resistance after 20 times of continuous dry-cleaning[1] | | | | | NOTE |
|---|---|---|---|---|---|---|
| | Remainder[2] (%) | After flame period (sec.) | After glow period (sec.) | Carbonized area (Char area) (cm$^2$) | Times contacting to flame | |
| 12 | 8.2 | 2.6 | 4.7 | 28.3 | — | |
| 13 | 8.0 | 2.8 | 4.9 | 29.6 | — | |
| 14 | 8.3 | 2.7 | 4.7 | 28.5 | — | |
| 15 | 7.6 | 2.9 | 4.8 | 29.0 | — | |
| 16 | 7.7 | 2.8 | 4.8 | 27.6 | 5 | |
| 17 | 8.0 | 2.7 | 4.3 | 26.0 | — | |
| 18 | 7.6 | 2.8 | 4.6 | 27.8 | — | mixture of solutions of [1] and [2] |
| 19 | 7.4 | 2.7 | 4.7 | 29.3 | — | mixture of solutions of [2] and [4] |
| 20 | 7.9 | 2.9 | 4.4 | 26.9 | — | mixture of solutions of [1] and [2] |
| 21 | 8.0 | 2.9 | 4.9 | 28.9 | 5 | mixture of solutions of [4] and [6] |
| 22 | 7.8 | 2.7 | 4.6 | 29.3 | — | mixture of solutions of [7] and [10] | percent of a non-ionic surfactant (Nonipol 100, product of Sanyo Chemical Industry (Kasei) Co., Ltd.) with the flame-proofing agents. The curing catalysts as shown in Table II were added to the resulting solutions to prepare suitable immersing solutions. The same procedures as in Example 1 were carried out.

All of the treated textiles passed the specifications of flame-resistant testing methods in accordance with the Japanese Industrial Standard JIS-A-8952/1970. The testing results are set forth in Table II.

TABLE II

Test of Flame-Resistance on Flame-Proofing Treatment of JISA-8952-1970 (O/W type emulsion)

| Experiment | Fabric weight/area (g/m$^2$) | Solution | | Pickup[2] (%) | Rate of Add-on after curing, soaping, rinsing[3] (%) |
|---|---|---|---|---|---|
| | | Flame-proofing agent (g/l) | Curing catalyst (g/l) | | |
| 23 | Cotton (240.5) | [1] (150) | Zn(BF$_4$)$_2$(5) | 74.8 | 9.2 |
| 24 | Cotton (240.5) | [2] (150) | Zn(BF$_4$)$_2$(5) | 74.2 | 8.9 |
| 25 | Hemp (265.4) | [1] (150) | Zn(BF$_4$)$_2$(5) | 70.3 | 8.6 |
| 26 | Cotton (240.5) | [3] (150) | Zn(BF$_4$)$_2$(5) | 78.1 | 9.8 |
| 27 | Cotton (240.5) | [4] (150) | NH$_4$Cl(2.5) | 74.2 | 9.6 |
| 28 | Cotton (240.5) | [5] (150) | NH$_4$Cl(2.5) | 70.6 | 8.9 |
| 29 | Polyamide (175.0) | [6] (150) | Zn(BF$_4$)$_2$(5) | 71.3 | 9.2 |
| 30 | Polyacrylonitrile (232.3) | [7] (150) | NH$_4$BF$_4$(5) | 78.6 | 9.3 |
| 31 | Cotton (240.5) | [8] (150) | Zn(BF$_4$)$_2$(10) | 71.4 | 8.7 |
| 32 | Wool (160.3) | [9] (150) | Zn(BF$_4$)$_2$(5) | 73.5 | 9.1 |
| 33 | Polyvinylalcohol (220.5) | [10] (180) | Zn(BF$_4$)$_2$(5) | 70.2 | 9.8 |
| 34 | Cotton (240.5) | [11] (150) | NH$_4$H$_2$PO$_4$(5) | 76.1 | 9.2 |
| 35 | Rayon (Cu-ammonium) (133.0) | [12] (180) | Zn(BF$_4$)$_2$(5) | 74.3 | 9.4 |
| 36 | Cotton (240.5) | [13] (150) | (NH$_4$)$_2$HPO$_4$(10) | 78.2 | 8.6 |
| 37 | Cotton (240.5) | [14] (150) | (NH$_4$)$_2$HPO$_4$(10) | 79.0 | 9.6 |
| 38 | Silk (148.0) | [15] (150) | (NH$_4$)$_2$HPO$_4$(10) | 74.1 | 8.9 |
| 39 | Cotton (240.5) | [16] (150) | Zn(BF$_4$)$_2$(5) | 71.9 | 9.7 |
| 40 | Cotton (240.5) | [1] (75) [9] (75) | Zn(BF$_4$)$_2$(5) | 76.5 | 9.6 |
| 41 | Cotton (240.5) | [1] (75) [2] (75) | Zn(BF$_4$)$_2$(5) | 73.6 | 8.6 |
| 42 | Wool (160.3) | [1] (75) [2] (75) | Zn(BF$_4$)$_2$(5) | 79.6 | 8.4 |
| 43 | Polyamide (175.0) | [4] (75) [6] (75) | Zn(NO$_3$)$_2$(5) | 76.5 | 9.3 |
| 44 | Rayon (Cu-ammonium) (133.0) | [10] (75) [12] (75) | Zn(BF$_4$)$_2$(5) | 73.1 | 9.6 |

| Experiment | Flame resistance after 20 times continuous washing | | | | Frequency of flame contact[1] |
|---|---|---|---|---|---|
| | Remainder[2] (%) | After flame period (sec.) | After glow period (sec.) | Carbonized area (Char area) (cm$^2$) | |
| 23 | 8.3 | 2.6 | 4.8 | 28.5 | — |
| 24 | 7.9 | 2.8 | 4.2 | 26.3 | — |
| 25 | 7.6 | 2.9 | 4.9 | 29.5 | — |
| 26 | 8.9 | 2.7 | 4.4 | 24.7 | — |
| 27 | 8.4 | 2.6 | 4.6 | 29.0 | — |
| 28 | 8.3 | 2.7 | 4.3 | 28.5 | — |
| 29 | 7.7 | 2.9 | 4.5 | 29.1 | — |
| 30 | 8.2 | 2.6 | 4.6 | 28.7 | 4 |
| 31 | 7.3 | 3.0 | 4.5 | 28.4 | 4 |
| 32 | 7.9 | 2.7 | 4.8 | 22.3 | — |
| 33 | 8.2 | 2.7 | 4.7 | 26.4 | 5 |
| 34 | 8.5 | 2.4 | 4.0 | 22.1 | — |
| 35 | 8.4 | 2.7 | 4.3 | 26.5 | — |
| 36 | 7.6 | 2.6 | 4.8 | 28.3 | — |
| 37 | 9.0 | 2.3 | 4.7 | 22.9 | — |
| 38 | 8.1 | 2.9 | 4.1 | 28.4 | 4 |
| 39 | 8.6 | 2.9 | 4.5 | 29.0 | — |

| Experiment | Flame resistance after 20 times continuous washing | | | | |
|---|---|---|---|---|---|
| | Remainder[2] (%) | After flame period (sec.) | After glow period (sec.) | Carbonized area (Char area) (cm$^2$) | Frequency of flame contact[1] |
| 40 | 8.4 | 2.8 | 4.8 | 28.3 | — |
| 41 | 7.8 | 2.9 | 4.6 | 29.1 | — |
| 42 | 7.0 | 2.4 | 4.3 | 28.0 | — |
| 43 | 8.2 | 2.7 | 4.5 | 24.3 | 4 |
| 44 | 7.6 | 2.9 | 4.6 | 29.2 | — |

| Experiment | Flame resistance after 20 times continuous dry-cleaning[1] | | | | | NOTE | | |
|---|---|---|---|---|---|---|---|---|
| | Remainder[2] (%) | After flame period (sec.) | After glow period (sec.) | Carbonized area (Char area) (cm$^2$) | Frequency of flame contact | | | |
| 23 | 7.9 | 2.8 | 4.7 | 26.0 | — | [3]o/w type emulsion tear strength, (F) 3.2% decrease | [4]tensile strength, (F) 3.7% decrease | [5]dry wrinkle resistance, (W+F)63% increase |
| 24 | 7.6 | 2.9 | 4.6 | 24.8 | — | | | |
| 25 | 8.0 | 2.4 | 4.3 | 28.0 | — | | | |
| 26 | 8.3 | 2.8 | 4.8 | 25.3 | — | | | |
| 27 | 8.4 | 2.7 | 4.5 | 27.3 | — | | | |
| 28 | 7.6 | 2.9 | 4.4 | 29.4 | — | | | |
| 29 | 7.9 | 2.9 | 4.9 | 28.3 | 4 | [3]o/w type emulsion, tear strength, (F) 27% decrease | [4]tensile strength, (F) 32% decrease | [5]dry wrinkle resistance, (W+F)52% increase |
| 30 | 8.3 | 2.4 | 4.8 | 26.5 | 4 | | | |
| 31 | 7.9 | 2.7 | 4.9 | 25.1 | — | solubilized solution o/w emulsion | | |
| 32 | 7.3 | 2.9 | 4.4 | 27.2 | — | | | |
| 33 | 8.6 | 2.8 | 4.5 | 29.0 | 5 | Do. | | |
| 34 | 8.0 | 2.4 | 4.2 | 26.4 | — | Do. | | |
| 35 | 7.4 | 2.7 | 4.6 | 23.9 | — | [3]tear strength, (F) 24% decrease solubilized solution | [4]tensile strength, (F) 3.6% decrease | [5]dry wrinkle resistance, (W+F) 57% increase |
| 36 | 7.9 | 7.6 | 4.8 | 29.8 | — | o/w type emulsion | | |
| 37 | 8.1 | 2.5 | 4.4 | 25.4 | — | Do. | | |
| 38 | 8.3 | 2.9 | 4.5 | 25.3 | 5 | Do. | | |
| 39 | 8.9 | 2.7 | 4.2 | 28.3 | — | Do. | | |
| 40 | 8.9 | 2.8 | 4.8 | 29.2 | — | Do. | mixture of solutions of [1] and [9] | |
| 41 | 7.6 | 2.6 | 4.9 | 26.8 | — | Do. | [1] and [2] | |
| 42 | 7.4 | 2.4 | 4.3 | 27.0 | — | Do | [1] and [2]*** | |
| 43 | 8.6 | 2.9 | 4.6 | 28.4 | 4 | Do. | [4] and [6] | |
| 44 | 7.7 | 2.6 | 4.5 | 27.9 | — | Do. | [10] and [12] | |

***Tear strength, (F) 22% decrease; tensile strength (F) 4.1% decrease; dry wrinkle resistance, (W+F) 52% increase.

EXAMPLES 45 through 65

A portion of the halogen atoms in compounds [1] through [16], except compounds [4] and [8] were substituted with sodium sulfonate to form aqueous solutions.

The curing catalysts as shown in Table III were added in the said aqueous solutions to prepare suitable immersing solutions. Similar operations as in Example 1 were carried out. All of the treated textiles passed the Flame-resistance Testing Methods in accordance with Japanese Industrial Standard JIS-A-8952/1970. The results are shown in Table III.

TABLE III

Test of Flame-resistance on Flame-Proofing Treatment JISA-8952-1970(Aqueous solution of —SO$_3$Na substituents of compound 1–16)

| Experiment | Fabric (weight/area)(g/m$^2$) | Solution | | pickup[2] (%) |
|---|---|---|---|---|
| | | Flame-proofing agent | Curing catalyst (g/l) | |
| 45 | Cotton (240.5) | [1]-1S (150) | NH$_4$BF$_4$(5) | 73.9 |
| 46 | Wool(160.3) | [2]-1S (150) | NH$_4$BF$_4$(5) | 76.3 |
| 47 | Cotton (240.5) | [1]-2S (150) | NH$_4$BF$_4$(5) | 71.6 |
| 48 | Polyamide (175.0) | [3]-1S (150) | NH$_4$BF$_4$(5) | 78.9 |
| 49 | Hemp (265.4) | [5]-1S (150) | NH$_4$BF$_4$(5) | 70.4 |
| 50 | Silk (148.0) | [6]-1S (180) | NH$_4$BF$_4$(8) | 76.2 |
| 51 | Polyacrylonitrile (232.3) | [3]-1S (150) | (NH$_4$)$_2$HPO$_4$(5) | 72.9 |
| 52 | Rayon (Cu-ammonium) (133.0) | [7]-1S (150) | Zn(BF$_4$)$_2$(5) | 78.5 |
| 53 | Cotton (240.5) | [9]-2S (150) | Zn(BF$_4$)$_2$(5) | 70.5 |
| 54 | Polyvinylalcohol (220.5) | [10]-1S (150) | Zn(BF$_4$)$_2$(5) | 76.6 |
| 55 | Cotton (240.5) | [11]-1S (150) | Zn(BF$_4$)$_2$(5) | 74.9 |
| 56 | Cotton (240.5) | [12]-1S (150) | Zn(NO$_3$)$_2$(5) | 78.9 |
| 57 | Acetate Rayon (139.4) | [13]-1S (180) | Zn(BF$_4$)$_2$(10) | 76.3 |
| 58 | Polyester (149.8) | [13]-1S (180) | Zn(BF$_4$)$_2$(10) | 79.2 |
| 59 | Wool (160.3) | [14]-1S (180) | Zn(BF$_4$)$_2$(10) | 76.5 |
| 60 | Cotton (240.5) | [15]-1S (180) | Zn(BF$_4$)$_2$(10) | 74.3 |
| 61 | Hemp (265.4) | [16]-1S (180) | Zn(BF$_4$)$_2$(10) | 78.1 |
| 62 | Cotton (240.5) | [2]-1S (75) [3]-1S (75) | Zn(BF$_4$)$_2$(5) | 74.9 |

TABLE III

Test of Flame-resistance on Flame-Proofing Treatment JISA-8952-1970(Aqueous solution of —$SO_3Na$ substituents of compound 1–16)

| Experiment | Fabric (weight/area)(g/m²) | Solution Flame-proofing agent | | Curing catalyst (g/l) | pickup² (%) |
|---|---|---|---|---|---|
| 63 | Cotton (240.5) | [5]-1S<br>[4]-1S | (75)<br>(75) | $Zn(BF_4)_2$(5) | 78.8 |
| 64 | Polyvinylalcohol (220.5) | [3]-1S<br>[13]-1S | (80)<br>(70) | $Zn(NO_3)_2$(5) | 74.5 |
| 65 | Acetate Rayon (139.4) | [6]-1S<br>[2]-1S | (75)<br>(75) | $NH_4BF_4$(5) | 75.9 |

| Experiment | Rate of add-on after curing, soaping, rinsing² (%) | Flame-resistance after 20 times continuous washing | | | | |
|---|---|---|---|---|---|---|
| | | Remainder² (%) | After flame period (sec) | After glow period (sec.) | Carbonized area (Char area) (cm²) | Frequency of flame contact¹ |
| 45 | 8.4 | 7.4 | 2.6 | 4.6 | 28.3 | — |
| 46 | 8.9 | 7.6 | 2.8 | 4.6 | 29.5 | — |
| 47 | 9.2 | 7.7 | 2.5 | 4.3 | 26.1 | — |
| 48 | 8.8 | 7.9 | 2.7 | 4.7 | 27.3 | 4 |
| 49 | 8.7 | 7.1 | 2.5 | 2.6 | 29.5 | — |
| 50 | 9.1 | 7.8 | 2.9 | 4.3 | 22.3 | 4 |
| 51 | 9.2 | 7.5 | 2.3 | 4.1 | 25.0 | 5 |
| 52 | 8.4 | 8.0 | 2.6 | 4.8 | 28.8 | 5 |
| 53 | 8.6 | 7.8 | 2.6 | 4.7 | 28.6 | — |
| 54 | 9.2 | 7.7 | 2.8 | 4.4 | 27.3 | 4 |
| 55 | 8.3 | 7.5 | 2.1 | 4.5 | 26.4 | — |
| 56 | 8.9 | 8.0 | 3.0 | 4.1 | 27.5 | — |
| 57 | 9.1 | 7.9 | 2.8 | 4.9 | 23.1 | — |
| 58 | 8.6 | 8.1 | 2.1 | 4.6 | 26.3 | 5 |
| 59 | 9.1 | 7.7 | 2.8 | 4.7 | 28.4 | — |
| 60 | 8.3 | 7.6 | 2.9 | 4.8 | 28.7 | — |
| 61 | 9.1 | 7.2 | 2.8 | 4.3 | 29.4 | — |
| 62 | 8.6 | 7.6 | 2.6 | 4.9 | 28.6 | — |
| 63 | 9.2 | 7.8 | 2.9 | 4.8 | 29.3 | — |
| 64 | 9.4 | 7.9 | 2.6 | 4.5 | 26.2 | 5 |
| 65 | 9.1 | 7.8 | 2.6 | 4.8 | 28.4 | — |

| Experiment | Flame resistance after 20 times continuous dry-cleaning | | | | | NOTE | | |
|---|---|---|---|---|---|---|---|---|
| | Remainder (%) | After flame period (sec.) | After glow period (sec.) | Carbonized area (Char area) (cm²) | frequency of flame contact | | | |
| 45 | 7.6 | 2.8 | 4.3 | 27.2 | — | ³tear strength (F) 31% decrease | ⁴tensile strength (F) 3.5% decrease | ⁵dry wrinkle resistance (W+F) 59% increase |
| 46 | 7.9 | 2.9 | 4.5 | 29.6 | — | | | |
| 47 | 7.4 | 2.7 | 4.5 | 28.0 | — | | | |
| 48 | 8.1 | 2.8 | 4.6 | 27.2 | 4 | | | |
| 49 | 7.9 | 2.5 | 4.1 | 29.2 | — | | | |
| 50 | 7.5 | 2.5 | 4.6 | 28.8 | 5 | | | |
| 51 | 8.0 | 2.9 | 4.4 | 27.8 | 5 | | | |
| 52 | 7.7 | 2.5 | 4.9 | 26.9 | 5 | ³tear strength (F) 29% decrease | ⁴tensile strength (F) 3.9% decrease | ⁵dry wrinkle resistance (W+F) 63% increase |
| 53 | 7.5 | 2.6 | 4.7 | 25.6 | — | | | |
| 54 | 7.6 | 2.8 | 4.2 | 29.7 | 4 | | | |
| 55 | 7.4 | 2.6 | 4.5 | 26.6 | — | | | |
| 56 | 7.8 | 2.4 | 5.0 | 29.3 | — | | | |
| 57 | 8.0 | 2.7 | 4.1 | 28.0 | — | | | |
| 58 | 7.6 | 2.2 | 4.7 | 26.2 | 5 | ³tear strength (F) 34% decrease | ⁴tensile strength (F) 2.6% decrease | ⁵dry wrinkle resistance (W+F) 64% increase |
| 59 | 7.6 | 2.3 | 4.5 | 26.8 | — | | | |
| 60 | 7.7 | 2.9 | 4.9 | 28.3 | — | | | |
| 61 | 7.4 | 2.8 | 4.8 | 29.2 | — | | | |
| 62 | 7.9 | 2.8 | 4.7 | 29.3 | — | mixture of solutions of [2]-1S and [3]-1S | | |
| 63 | 7.6 | 2.7 | 4.9 | 29.8 | — | [5]-1S and [9]-1S*** | | |
| 64 | 7.6 | 2.4 | 4.3 | 26.5 | 5 | [2]-1S and [12]-1S | | |
| 65 | 7.9 | 2.9 | 4.6 | 28.3 | — | [6]-1S and [2]-1S | | |

*** Tear strength (F) 27% decrease; tensile strength (F) 3.1% decrease; dry wrinkle resistance (W+F) 53% increase.

Comparison References 1 through 4

The primary solution consisting of 16 weight parts of tetrakis-hydroxymethyl-phosphonium chloride having a structural formula:

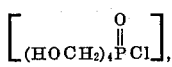

18 weight parts of water and 3 weight parts of triethanol amine and a secondary solution consisting of 9.5 weight parts of trimethylolmelamine, 9.9 weight parts of urea and 45.1 weight parts of water, were prepared. The primary solution and the secondary solution were mixed with each other for 30 minutes before being used. The treatable textile was dipped in the solution to obtain a pick-up of 70 to 80 percent, of 100 to 110 percent, of 130 to 140 percent, and of 150 to 160 percent. Curing was effected at 85°C. for 4.5 minutes and then at 140°C. for 45 minutes.

The treated textiles were further treated by soaping with a bath having a bath ratio of 50, at a temperature of 90°C. for 20 minutes using an aqueous solution containing 0.25 weight percent of $Na_2CO_3$ and 0.25 weight percent of Nissan Maruseru Soap, a product of Nippon Fats and Oils Co., Ltd., while agitating vigorously. The textile was then rinsed in a bath having a bath ratio of 100 at a temperature of 40°C. for 15 minutes. The textile was dried and was tested by the Flame-resistance Testing method as previously applied to Examples 1 to 21. These fabrics indicated an adhesion rate of 45.3 weight percent or more per 100 weight percent of untreated textile as stipulated in JIS (Japanese Industrial Standard)-A-8952/1970. The said fabric was cleaned 20 times as described above using soap and rinsing. As a result, it was found that the add-on rate was low, and the flame-resistant nature was low. It was also found that textiles which initially passed the tests, did not pass the same tests after 20 times of continuous cleaning steps. These testing results are shown in Table IV.

parts of tris (1-aziridinyl)phosphine oxide having a structural formula:

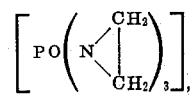

15 weight parts of thiourea, 3 weight parts of polyethylene softening agent Parmalin-PN, product of Sanyo Chemical Industry Co., Ltd.), 0.2 weight parts of permeating agent (Emulgen-810, product of Kawo Atlas Co., Ltd.) and 56.8 weight parts of water, was prepared. A treatable textile was dipped in the immersing solution at a pick-up rate of 60 to 70 percent, a rate of 80 to 90 percent, a rate of 110 to 120 percent and a rate of 140 to 150 percent. Drying was effected at 80°C. for 5 minutes and curing at 160°C. for 2 minutes. The thermally treated fabric was soaped by use of an aqueous solution containing 0.25 weight parts of $Na_2CO_3$ and 0.25 weight parts of Nissan Maruseru Soap, a product of Nippon Fats and Oils Co., Ltd., using a bath having a bath ratio of 50 at a temperature of 90°C. while vigorously agitating for 20 minutes. Rinsing was carried out in water at 40°C. and a bath ratio of 100 for 15 minutes.

The fabric samples were dried and the same flame-resistant test as in Examples 1 through 21 was performed. The textile sample indicated an adhesion ratio of 42.8 weight percent or more per 100 weight parts of untreated textile was only admitted in the specification of JIS (Japanese Industrial Standard)-A-8952/1970. Further, the textile sample which had been treated with the APO treating process and the soaping step was cleaned 20 times using soap and water.

It was found that the rate of adhesion was deteriorated and flame-resistancy was also deteriorated.

The textile sample which initially passed the tests, did not pass the same tests after 20 times of continuous cleaning.

The resulting tests are shown in Table V.

TABLE IV

Test of Flame-resistance on Flame-Proofing Treatment of JISA-8952-1970 (tetrakishydroxymethyl phosphonium chloride)

| Reference | Fabric (weight/area) (g/m²) | Pick-up² (%) | Flame resistance after 1 time curing, soaping, rinsing¹ | | | | |
|---|---|---|---|---|---|---|---|
| | | | Remainder² (%) | After flame period (sec.) | After glow period (sec.) | Carbonized area (Char area) (cm²) | Frequency of flame contact |
| 1 | Cotton (240.5) | 74.5 | 20.4 | 3.8 | 6.4 | 38.9 | — |
| 2 | Cotton (240.5) | 106.3 | 30.1 | 3.2 | 4.9 | 31.8 | — |
| 3 | Cotton (240.5) | 132.9 | 38.9 | 2.9 | 4.7 | 31.3 | — |
| 4 | Cotton (240.5) | 152.1 | 45.3 | 2.7 | 4.4 | 26.3 | — |

| Reference | Flame-resistance after 20 times continuous washing¹ | | | | | NOTE |
|---|---|---|---|---|---|---|
| | Remainder (%) | After flame period (sec.) | After glow period (sec.) | Carbonized area (Char area) (cm²) | Frequency of flame contact | |
| 1 | 16.8 | 4.5 | 7.9 | 49.8 | — | feeling:soft; ³tear strength (F) 60% decrease; ⁴tensile strength (F) 6.8% decrease; ⁵dry wrinkle resistance (W+F) 34% increase. |
| 2 | 24.1 | 3.9 | 7.4 | 26.6 | — | feeling:hard; ³tear strength (F) 78% decrease; ⁴tensile strength (F) 20.4% decrease; ⁵dry wrinkle resistance (W+F) 28% increase. |
| 3 | 32.6 | 2.8 | 4.9 | 36.8 | — | feeling:hard |
| 4 | 40.2 | 2.8 | 4.6 | 30.9 | — | feeling:hard |

Comparison References 5 to 8

An immersing solution which consists of 25 weight

TABLE V

Test of Flame resistance on flame-proofing treatment of JISA-8952-1970 (tris (1-aziridinyl)phosphine oxide)

| Reference | Fabric (weight/area)(g/m²) | Pick-up² (%) | Flame resistance after 1 time curing, soaping, rinsing[1] | | | | |
|---|---|---|---|---|---|---|---|
| | | | Remainder² (%) | After flame period (sec.) | After glow period (sec.) | Carbonized area (Char area) (cm²) | Frequency of flame contact |
| 5 | Cotton (240.5) | 63.9 | 18.0 | 4.9 | 7.0 | 43.2 | — |
| 6 | Cotton (240.5) | 34.3 | 27.3 | 2.5 | 5.2 | 29.8 | — |
| 7 | Cotton (240.5) | 128.4 | 42.3 | 2.7 | 4.6 | 26.8 | — |
| 8 | Cotton (240.5) | 145.6 | 49.5 | 2.6 | 4.2 | 25.3 | — |

| Reference | Flame resistance after 20 times continuous washing[1] | | | | | NOTE |
|---|---|---|---|---|---|---|
| | Remainder² (%) | After flame period (sec.) | After glow period (sec.) | Carbonized area (Char area) (cm²) | Frequency of flame contact | |
| 5 | 14.3 | 5.8 | 7.4 | 50.9 | — | feeling:soft; ³tear strength (F) 63% decrease; ⁴tensile strength (F) 8.9% decrease; ⁵dry wrinkle resistance (W+F) 29% increase |
| 6 | 22.1 | 4.3 | 5.8 | 34.5 | — | feeling:slightly hard; ³tear strength (F) 81% decrease; ⁴tensile strength (F) 10.4% decrease; ⁵dry wrinkle resistance 27% increase |
| 7 | 37.4 | 2.9 | 5.1 | 28.5 | — | feeling: hard |
| 8 | 44.3 | 2.8 | 4.7 | 26.3 | — | feeling:hard |

Comparison References 9 through 12

An immersing solution which consists of 30 weight parts of N-hydroxymethyl-3-(dimethylphospho)propine amide having a structural formula of:

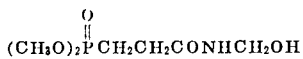

$$(CH_3O)_2\overset{O}{\underset{\|}{P}}CH_2CH_2CONHCH_2OH$$

8 weight parts of trimethylol-melamine, one weight part of urea, 0.4 weight part of ammonium chloride, 0.2 weight parts of permeating agent, i.e., Emulgen-810, product of Kawo Atlas Co., Ltd., 2 weight parts of polyethylene softening agent, i.e., Permalin-PN, product of Sanyo Chemical Industry Co., Ltd., and 58.4 weight parts of water, was prepared. A treatable textile was dipped into the said immersing solution at a pickup rate of 70 to 80 percent, 100 to 110 percent, 130 to 140 percent, and 150 to 160 percent.

Drying was carried out at 85°C. for 5 minutes and curing at 160°C. for 45 minutes.

This textile was treated with a bath having a bath ratio of 50 and at a temperature of 90°C. for 20 minutes while vigorously agitating using an aqueous solution containing 0.25 weight percent of $Na_2CO_3$ and 0.25 weight percent of Nissan Maruseru Soap, product of Nippon Fats and Oils Co., Ltd.

These samples were dried and the flame-resistant testing method as in Examples 1 to 21 was carried out. The textile sample indicated an adhesion ratio of 34.3 weight percent or more in proportion to 100 weight percent of untreated textile and passed the specifications of JIS (Japanese Industrial Standard)-A-8952/1970.

The said textile sample which had been treated with N-hydroxymethyl-3-(dimethylphosphono)propione amide and soaping and rinsing and was cleaned 20 times with soap and water. It was found that the rate of adhesion was deteriorated, and flame-resistancy was reduced.

The textile samples which passed the tests initially failed after 20 times of continuous cleaning.

The testing results are shown in Table VI.

TABLE VI

Test of Flame Resistance on Flame-Proofing Treatment of JISA-8952-1970 (N-hydroxymethyl-3-(dimethylphosphono)propionamide

| Reference | Fabric (weight/area) (g/m²) | Pick-up² (%) | Flame resistance after 1 time curing, soaping, rinsing[1] | | | | |
|---|---|---|---|---|---|---|---|
| | | | Remainder² (%) | After flame period (sec.) | After glow period (sec.) | Carbonized area (Char area) (cm²) | Frequency of flame contact |
| 9 | Cotton (240.5) | 74.6 | 18.9 | 5.2 | 6.9 | 48.9 | — |
| 10 | Cotton (240.5) | 106.7 | 27.4 | 3.9 | 5.1 | 35.4 | — |
| 11 | Cotton (240.5) | 129.3 | 34.3 | 2.4 | 4.6 | 28.3 | — |
| 12 | Cotton (240.5) | 155.4 | 41.0 | 2.2 | 4.1 | 26.5 | — |

| Reference | Flame resistance after 20 times continuous washing[1] | | | | | NOTE |
|---|---|---|---|---|---|---|
| | Remainder² (%) | After flame period (sec.) | After glow period (sec.) | Carbonized area (Char area) (cm²) | Frequency of flame contact | |
| 9 | 15.2 | 6.4 | 7.7 | 51.3 | — | feel: soft; ³tear strength (F) 37% decrease; ⁴tensile strength (F) 4.7% decrease; ⁵dry wrinkle resistance (W+F) 60% increase |
| 10 | 24.3 | 4.8 | 5.6 | 40.3 | — | feel: soft; ³tear strength (F) 45% decrease; ⁴tensile strength (F) 8.3% decrease; ⁵dry wrinkle resistance (W+F) 49% increase |
| 11 | 29.5 | 2.9 | 4.9 | 31.2 | — | feel:slightly hard; ³tear strength (F) 57% decrease; ⁴tensile strength (F) 18.1% decrease; ⁵dry wrinkle resistance (W+F) 38% increase |
| 12 | 38.6 | 2.4 | 4.4 | 29.7 | — | feel: hard |

Practical Examples 66 – 94

The compounds from [16] to [36] were dissolved in the organic solvents shown in Table VII and the curing catalysts shown in Table I were added. The fabrics to be treated, as shown in Table VII, was soaked in the liquid (padding), their pick-up being 60 – 80 percent, and were dried up to 5 minutes at 80°C. After that, curing was performed for 5 minutes at 110°C. Each cloth treated by heat was stirred vigorously for 20 minutes at 90°C. with a liquor ratio of 50 using a water solution containing 0.25 wt. % $Na_2CO_3$ and 0.25 wt. % Maruseru soap (product of Nippon Yushi K.K., Nissan Marusenu Soap), and then rinsed for 15 minutes with water at 40°C. with a liquor ratio of 100.

One group was subjected to washing with soap and water 20 times, and another group was dry-cleaned 20 times using Perklene (perchloroethylene) as a dry-cleaning solvent, stirred vigorously for 20 minutes at 50°C. with a liquor ratio of 50. Both groups were dried and the flame-resistance tests of JIS-A-8952-1970 were executed.

As a result, as shown in Table VII, low add-on percentages were obtained, and all of the fabrics passed the standards.

When 10 parts were adhered to 100 parts of untreated cloth, it is called an add-on percentage of 10 percent. In the case of pick-up, if 70 parts of soaking liquid is picked up by 100 parts of untreated cloth, it is referred to as a pick-up rate of 70 percent. The test fabrics were measured by the Monsanto method after curing, soaping and rinsing, and compared with the untreated cloth. They were then measured by the Grab method of JIS L1068-1964 after curing, soaping and rinsing and compared with untreated cloth. They were further measured by the Pendulum method using an Ermendorf type tester after curing, soaping and rinsing and were compared with untreated cloth.

TABLE VII

Test of Flame Resistance on Flame-Proofing Treatment of JISA-8952-1970 (organic solvent)

| Experiment | Fabric (weight/area(g/m$^2$)) | Solution | | | Pick-up$^2$ (%) |
|---|---|---|---|---|---|
| | | Flame-proofing agent (g/l) | Catalyst for Curing (g/l) | Solvent | |
| 66 | Cotton (240.5) | [16]-Br(150) | $Zn(BF_4)_2(5)$ | ethanol | 76.0 |
| 67 | Hemp (265.4) | [16]-Cl(150) | $Zn(BF_4)_2(5)$ | methanol | 74.3 |
| 68 | Cotton (240.5) | [17]-Br(150) | $NH_4BF_4(10)$ | methanol | 79.8 |
| 69 | Polyvinylalcohol (220.5) | [17]-Cl(180) | $NH_4BF_4(5)$ | ethanol | 76.7 |
| 70 | Polyacrylonitrile (232.3) | [18]-Br(150) | $(NH_4)_2HPO_4(10)$ | ethanol | 69.3 |
| 71 | Cotton (240.5) | [19]-Br(150) | $Zn(NO_3)_2(5)$ | DMF | 78.6 |
| 72 | Polyamide (175.0) | [20]-Cl(150) | $NH_4H_2PO_4(10)$ | methanol | 73.0 |
| 73 | Rayon (Cu-ammonium) (133.0) | [21]-Br(150) | $Zn(BF_4)_2(5)$ | DMF | 70.4 |
| 74 | Cotton (240.5) | [22]-Br(150) | $Zn(BF_4)_2(5)$ | ethanol | 67.1 |
| 75 | Acetate Rayon (189.4) | [22]-Cl(180) | $(NH_4)_2HPO_4(10)$ | ethanol | 75.2 |
| 76 | Staple fiber (143.6) | [23]-Br(150) | $Zn(NO_3)_2(5)$ | methanol | 70.5 |
| 77 | Polyvinylidene chloride (221.8) | [24]-Br(150) | $(NH_4)_2HPO_4(10)$ | ethanol | 79.4 |
| 78 | Silk (148.0) | [25]-Br(150) | $Zn(BF_4)_2(5)$ | methanol | 73.6 |
| 79 | Wool (160.3) | [25]-Br(150) | $(NH_4)_2HPO_4(10)$ | methanol | 70.1 |
| 80 | Cotton (240.5) | [26]-Br(180) | $Zn(BF_4)_2(5)$ | methanol | 77.7 |
| 81 | Modacryl (191.4) | [27]-Br(180) | $NH_4H_2PO_4$ | methanol | 65.6 |
| 82 | Polyester (149.8) | [28]-Cl(150) | $Zn(BF_4)_2(5)$ | ethanol | 76.0 |
| 83 | Polyamide (175.0) | [29]-Br(150) | $NH_4BF_4(10)$ | ethanol | 75.5 |
| 84 | Cotton (240.5) | [30]-Cl(150) | $NH_4CL(10)$ | DMF | 76.2 |
| 85 | Hemp (265.4) | [31]-Br(150) | $Zn(NO_3)_2(5)$ | DMF | 78.1 |
| 86 | Cotton (240.5) | [32]Cl(180) | $Zn(NO_3)_2(5)$ | methanol | 71.5 |
| 87 | Polyvinylalcohol (220.5) | [33]-Br(150) | $NH_4BF_4(10)$ | ethanol | 74.3 |
| 88 | Silk (148.0) | [34]-Br(150) | $Zn(BF_4)_2(5)$ | ethanol | 76.0 |
| 89 | Cotton (240.5) | [35]-Cl(150) | $NH_4BF_4(5)$ | methanol | 73.2 |
| 90 | Acetate Rayon (189.4) | [36]-Br(150) | $Zn(BF_4)_2(5)$ | DMF | 75.6 |
| 91 | Cotton (240.5) | [16]-Br(75) [17]-Br(75) | $(NH_4)_2HPO_4(10)$ | methanol | 74.3 |
| 92 | Cotton (240.5) | [16]-Br(75) [17]-Br(75) | $Zn(NO_3)_2(5)$ | methanol | 76.6 |
| 93 | Polyvinylalcohol (220.5) | [16]-Cl(75) [18]-Cl(75) | $Zn(BF_4)_2(5)$ | methanol | 71.5 |
| 94 | Hemp (265.4) | [19]-Br(75) [20]-Br(75) | $NH_4BF_4(5)$ | methanol | 78.2 |

| Experiment | Rate of Add-on after curing, soaping, rinsing$^2$ (%) | Flame resistance after 20 times continuous washing$^1$ | | | | |
|---|---|---|---|---|---|---|
| | | Remainder$^2$ (%) | After flame period (sec.) | After glow period (sec.) | Carbonized area (Char area)(cm$^2$) | Frequency of flame contact |
| 66 | 8.6 | 7.6 | 2.6 | 4.3 | 28.7 | — |
| 67 | 9.0 | 7.2 | 2.7 | 4.6 | 26.3 | — |
| 68 | 8.9 | 7.4 | 2.9 | 4.7 | 25.9 | — |
| 69 | 9.1 | 8.0 | 2.5 | 4.9 | 29.2 | 4 |
| 70 | 8.6 | 7.2 | 2.8 | 4.8 | 26.7 | 5 |
| 71 | 9.4 | 7.9 | 2.4 | 4.0 | 25.5 | — |
| 72 | 8.4 | 7.5 | 2.8 | 4.9 | 29.7 | 5 |
| 73 | 8.7 | 8.0 | 2.6 | 4.5 | 28.0 | — |
| 74 | 8.9 | 7.1 | 2.7 | 4.5 | 28.7 | — |

| Experiment | Rate of Add-on after curing, soaping, rinsing[2] (%) | Flame resistance after 20 times continuous washing[1] | | | | |
|---|---|---|---|---|---|---|
| | | Remainder[2] (%) | After flame period (sec.) | After glow period (sec.) | Carbonized area (Char area)(cm[2]) | Frequency of flame contact |
| 75 | 8.7 | 7.2 | 2.3 | 4.3 | 26.5 | — |
| 76 | 9.4 | 7.9 | 2.7 | 4.2 | 27.9 | — |
| 77 | 8.4 | 7.1 | 2.6 | 4.6 | 28.1 | 6 |
| 78 | 9.2 | 8.2 | 2.8 | 4.8 | 23.5 | — |
| 79 | 9.0 | 8.6 | 2.3 | 4.5 | 29.8 | 4 |
| 80 | 8.7 | 8.0 | 2.5 | 4.6 | 29.0 | — |
| 81 | 8.4 | 7.2 | 2.7 | 4.8 | 26.7 | 4 |
| 82 | 8.6 | 8.6 | 2.6 | 4.1 | 28.2 | 4 |
| 83 | 8.3 | 7.4 | 2.8 | 4.5 | 25.1 | 5 |
| 84 | 9.6 | 8.1 | 2.6 | 4.6 | 28.4 | — |
| 85 | 9.1 | 8.4 | 2.9 | 4.3 | 23.9 | — |
| 86 | 8.5 | 7.1 | 2.4 | 4.7 | 27.0 | — |
| 87 | 8.4 | 7.4 | 2.9 | 4.1 | 28.4 | 4 |
| 88 | 9.2 | 8.4 | 2.6 | 4.6 | 25.0 | — |
| 89 | 8.5 | 8.0 | 2.4 | 4.7 | 29.6 | — |
| 90 | 8.3 | 7.2 | 2.9 | 4.0 | 24.5 | — |
| 91 | 8.1 | 7.3 | 2.5 | 4.8 | 26.6 | — |
| 92 | 8.8 | 8.1 | 2.6 | 4.6 | 27.8 | — |
| 93 | 8.7 | 7.9 | 2.5 | 4.1 | 28.8 | 4 |
| 94 | 8.4 | 7.6 | 2.7 | 4.9 | 26.7 | — |

| Experiment | Flame resistance after 20 times continuous dry-cleaning[1] | | | | | NOTE |
|---|---|---|---|---|---|---|
| | Remainder[2] (%) | After flame period (sec.) | After glow period (sec.) | Carbonized area (Char area) (cm[2]) | Frequency of flame contact | |
| 66 | 7.1 | 2.3 | 4.8 | 27.6 | — | |
| 67 | 7.3 | 2.4 | 4.5 | 28.9 | — | [3]26% decrease; [4]5.7% decrease; [5]56% increase |
| 68 | 7.7 | 2.8 | 4.4 | 29.3 | — | |
| 69 | 7.4 | 2.7 | 4.5 | 28.0 | 4 | |
| 70 | 7.3 | 2.6 | 4.3 | 26.7 | 4 | |
| 71 | 7.6 | 2.9 | 4.0 | 29.0 | — | [3]24% decrease; [4]3.1% decrease; [5]59% increase |
| 72 | 7.7 | 2.3 | 4.8 | 28.5 | 5 | |
| 73 | 7.2 | 2.7 | 4.9 | 26.4 | — | |
| 74 | 7.6 | 2.7 | 4.7 | 26.5 | — | [3]26% decrease; [4]3.5% decrease; [5]64% increase |
| 75 | 7.4 | 2.6 | 4.4 | 27.1 | — | |
| 76 | 7.0 | 2.7 | 4.0 | 26.8 | — | |
| 77 | 7.5 | 3.0 | 4.7 | 29.9 | 5 | |
| 78 | 7.5 | 2.4 | 4.9 | 28.6 | — | |
| 79 | 8.0 | 2.7 | 4.5 | 26.5 | 4 | |
| 80 | 7.3 | 2.8 | 4.1 | 29.8 | — | |
| 81 | 7.6 | 2.6 | 4.8 | 23.0 | 4 | |
| 82 | 7.7 | 2.5 | 4.9 | 26.1 | 6 | |
| 83 | 7.1 | 2.7 | 4.3 | 27.4 | 4 | |
| 84 | 7.8 | 2.6 | 4.0 | 26.6 | — | |
| 85 | 7.1 | 2.9 | 4.8 | 24.3 | — | |
| 86 | 7.3 | 2.8 | 4.5 | 28.9 | — | |
| 87 | 7.0 | 2.6 | 4.9 | 25.7 | 4 | |
| 88 | 8.5 | 2.3 | 4.6 | 22.3 | — | |
| 89 | 7.6 | 2.7 | 4.1 | 28.6 | — | |
| 90 | 7.5 | 2.5 | 4.8 | 28.0 | — | |
| 91 | 7.2 | 3.0 | 4.6 | 27.7 | — | solution of mixture of [16]-Br and [17]-Br |
| 92 | 7.1 | 2.3 | 4.7 | 26.4 | — | solution of mixture of [16]-Br and [18]-Br |
| 93 | 8.0 | 2.7 | 4.6 | 26.0 | 5 | [3]23% decrease; [4]3.8% decrease; [5]61% increase |
| 94 | 7.2 | 2.5 | 4.8 | 29.3 | — | solution of mixture of [16]-Br and [18]-Cl solution of mixture of [18]-Br and [20]-Br |

Practical Examples 95 – 124

The compounds from [16] to [36] were made soluble or emulsified in an O/W type emulsion by employing non-ionic surface active agents (the Sanyo Kasei K.K.'s product, Nonipol 100) of 10 wt. % to flame-proofing agents. The curing catalysts shown in Table II were added to make a soaking liquid. The same operations with Practical Example 66 were performed. Each cloth which was treated, passed the flame-resistance tests of JIS-A-8952-1970.

TABLE VIII
Test of Flame Resistance on Flame-Proofing Treatment of JISA-8952-1970 (O/W Type Emulsion)

| Experiment | Fabric (weight/area(g/m[2]) | Solution | | Solution | Pick-up[2] (%) | Rate of Add-on after curing, soaping, rinsing[2] (%) |
|---|---|---|---|---|---|---|
| | | Flame-proofing agent (g/l) | Catalyst for curing (g/l) | | | |
| 95 | Cotton | [16]-Br(150) | $Zn(BF_4)_2(5)$ | O/W emulsion | 75.6 | 8.6 |
| 96 | Cotton | [16]-Cl(150) | $Zn(BF_4)_2(5)$ | " | 74.7 | 8.8 |
| 97 | Polyacrylonitrile | [17]-Br(150) | $Zn(BF_4)_2(5)$ | " | 79.6 | 8.4 |
| 98 | Cotton | [17]-Cl(180) | $NH_4Cl(10)$ | " | 77.8 | 8.7 |
| 99 | Cotton | [18]-Br(150) | $Zn(BF_4)_2(5)$ | " | 72.7 | 9.0 |
| 100 | Acetate Rayon | [19]-Cl(150) | $NH_4BF_4(10)$ | " | 76.9 | 8.6 |

TABLE VIII

Test of Flame Resistance on Flame-Proofing Treatment of JISA-8952-1970 (O/W Type Emulsion)

| Experiment | Fabric (weight/area(g/m²)) | Flame-proofing agent (g/l) | Catalyst for curing (g/l) | Solution | Pick-up[2] (%) | Rate of Add-on after curing, soaping, rinsing[2] (%) |
|---|---|---|---|---|---|---|
| 101 | Cotton | [20]-Cl(150) | $Zn(BF_4)_2(5)$ | " | 76.5 | 8.2 |
| 102 | Staple fiber | [21]-Cl(180) | $NH_4BF_4(5)$ | " | 68.0 | 8.5 |
| 103 | Polyester | [21]-Br(180) | $Zn(NO_3)_2$ | " | 79.9 | 9.3 |
| 104 | Polyamide | [22]-Br(150) | $NH_4Cl(10)$ | Solubilized solution | 78.0 | 8.7 |
| 105 | Rayon (Cu-ammonium) | [23]-Br(150) | $NH_4BF_4(5)$ | O/W emulsion | 76.6 | 8.8 |
| 106 | Hemp | [24]-Cl(150) | $NH_4Cl(10)$ | " | 74.2 | 9.0 |
| 107 | Cotton | [25]-Br(150) | $Zn(BF_4)_2(5)$ | " | 73.5 | 8.2 |
| 108 | Modacrylate | [26]-Br(180) | $(NH_4)_2HPO_4(10)$ | " | 70.3 | 9.1 |
| 109 | Polyvinylalcohol | [27]-Br(150) | $NH_4BF_4(5)$ | " | 79.0 | 8.9 |
| 110 | Cotton | [28]-Cl(150) | $NH_4H_2PO_4$ | Solubilized solution | 76.8 | 8.7 |
| 111 | Wool | [29]-Cl(150) | $Zn(BF_4)_2(5)$ | O/W emulsion | 75.5 | 9.0 |
| 112 | Silk | [30]-Br(150) | $NH_4H_2PO_4$ | " | 75.4 | 9.2 |
| 113 | Polypropylene | [31]-Cl(150) | $Zn(BF_4)_2(5)$ | O/W emulsion | 78.6 | 9.3 |
| 114 | Cotton | [32]-Br(180) | $NH_4BF_4(5)$ | " | 69.7 | 8.8 |
| 115 | Polyvinylchloride | [33]-Br(150) | $NH_4Cl(5)$ | " | 72.2 | 8.3 |
| 116 | Cotton | [34]-Br(150) | $NH_4BF_4(5)$ | " | 78.1 | 9.5 |
| 117 | Cotton | [35]-Cl(150) | $NH_4BF_4(5)$ | Solubilized solution | 78.6 | 8.7 |
| 118 | Hemp | [36]-Br(150) | $Zn(BF_4)_2(5)$ | O/W emulsion | 75.4 | 9.4 |
| 119 | Acetate Rayon | [16]-Br(75) [20]-Br(75) | $Zn(BF_4)_2(5)$ | " | 75.5 | 9.4 |
| 120 | Wool | [16]-Br(75) [19]-Br(75) | $Zn(BF_4)_2(5)$ | " | 76.3 | 8.4 |
| 121 | Cotton | [19]-Br(75) [20]-Br(75) | $Zn(BF_4)_2(5)$ | " | 74.6 | 9.2 |
| 122 | Silk | [22]-Br(75) [16]-Br(75) | $NH_4BF_4(5)$ | " | 76.6 | 9.3 |
| 123 | Cotton | [16]-Cl(75) [19]-Cl(75) | $Zn(BF_4)_2(5)$ | " | 74.3 | 8.9 |
| 124 | Cotton | [20]-Cl(75) [20]-Br(75) | $NH_4BF_4(5)$ | " | 78.0 | 9.1 |

| Experiment | Flame Resistance after 20 times continuous dry-cleaning[1] | | | | | NOTE |
|---|---|---|---|---|---|---|
| | Remainder[2] (%) | After flame period (sec.) | After glow period (sec.) | Carbonized area (Char area)(cm²) | Frequency of flame contact | |
| 95 | 7.9 | 2.4 | 4.4 | 25.6 | — | |
| 96 | 7.6 | 2.9 | 4.5 | 28.3 | — | |
| 97 | 7.6 | 2.8 | 4.5 | 26.5 | 5 | [3]25%decrease; [4]4.0%decrease; [5]50%increase |
| 98 | 8.1 | 2.7 | 4.8 | 28.1 | — | |
| 99 | 7.7 | 2.5 | 4.5 | 28.0 | — | |
| 100 | 7.6 | 2.2 | 4.4 | 27.7 | — | |
| 101 | 7.4 | 3.0 | 4.0 | 25.0 | — | |
| 102 | 7.5 | 2.3 | 4.2 | 27.6 | — | |
| 103 | 7.2 | 2.6 | 4.8 | 28.5 | 5 | [3]28% decrease; [4]2.5% decrease; [5]64% increase |
| 104 | 8.1 | 2.1 | 4.2 | 28.0 | 4 | [3]31% decrease; [4]3.6% decrease; [5]50% increase |
| 105 | 7.5 | 2.7 | 4.6 | 26.4 | — | |
| 106 | 7.4 | 2.8 | 4.3 | 26.3 | — | |
| 107 | 7.6 | 2.9 | 4.8 | 28.6 | — | |
| 108 | 8.2 | 2.7 | 4.5 | 26.3 | 5 | |
| 109 | 7.9 | 3.0 | 4.1 | 24.8 | 4 | |
| 110 | 8.3 | 2.4 | 4.8 | 26.9 | — | [3]35% decrease; [4]6.5% decrease; [5]55% increase |
| 111 | 7.3 | 2.3 | 4.1 | 28.0 | 4 | |
| 112 | 7.0 | 2.8 | 4.6 | 27.6 | — | |
| 113 | 7.4 | 2.7 | 4.2 | 28.1 | 5 | |
| 114 | 81. | 2.7 | 4.0 | 28.1 | — | |
| 115 | 7.4 | 2.4 | 4.4 | 28.0 | 5 | |
| 116 | 7.9 | 2.9 | 4.7 | 27.1 | — | |
| 117 | 7.9 | 2.6 | 4.3 | 29.3 | — | |
| 118 | 8.2 | 2.4 | 4.2 | 27.4 | — | |
| 119 | 7.0 | 2.8 | 4.8 | 27.7 | — | solution of mixture of [16]-Br and [17]-Br |
| 120 | 8.1 | 2.5 | 4.7 | 28.2 | 5 | solution of mixture of [16]-Br and [19]-Br |
| 121 | 8.6 | 2.1 | 4.1 | 27.6 | — | solution of mixture of [19]-Br and [20]-Br [3]24% decrease; [4]3.3 decrease; [5]57% increase |
| 122 | 8.1 | 2.8 | 4.6 | 28.3 | — | solution of mixture of [10]-Br and [18]-Br |
| 123 | 7.9 | 2.5 | 4.3 | 26.5 | — | solution of mixture of [16]-Cl and [17]-Cl |
| 124 | 7.6 | 2.9 | 4.5 | 27.3 | — | solution of mixture of [17]-Cl and [17]-Br |

Comparison Example 13

The two types of liquids, i.e., Liquid No. 1 consisting of 16 parts of tetrakis hydroxymethyl phosphonium chloride:

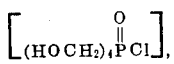

18 parts of water and 3 parts of triethanolamine and Liquid No. 2 consisting of 9.5 parts of trimethylolmelamine, 9.9 parts of urea and 45.1 parts of water were prepared. A cotton cloth (240.5 g/m²) was soaked therein with optional percentages of pick-up adjusted by a Mangler (a squeezing instrument) and was dried for 4.5 minutes at 85° C. and curing was performed for 5 minutes at 140°C. The cloth was then treated by heat, was soaped by being vigorously stirred for 20 minutes at 90°C. with a liquor ratio of 50 using a water solution containing 0.25 Wt. % of $Na_2CO_3$ and 0.25 wt. % of Maruseru soap (product of Nippon Yushi K.K., Nissan Maruseru Soap), and further was rinsed and dried for 15 minutes at 40°C. with a liquor ratio of 100.

The same flame resistance tests as in Practical Example 66 were executed. The pick-ups were 74.5 percent, 106.3 percent, 132.9 percent and 152.1 percent, the corresponding add-on percentages were, respectively, 20.4 percent, 30.1 percent, 38.9 percent and 45.3 percent. Only that having an add-on percentage of 45.3 percent passed the flame resistance test (namely, after flame seconds were less than 3 seconds, after glow seconds less than 5 seconds, and carbonization area less than 30 cm²). But even this one, when subjected to continuous washing 20 times, could not pass the carbonization test. Also, this cloth had a rough feel.

Comparison Example 14

A soaking liquid consisting of 25 parts of tris (1-Aziridinyl) phosphine oxide:

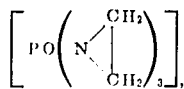

15 parts of thiourea, 3 parts of polyethylene softening agents (Parmalin PN, product of Sanyo Kasei Kogyo K.K.), 0.2 part of penetrant (Emulgen-810, product of Kao Atlas K.K.) and 56.8 parts of water was prepared. The cotton cloth to be treated (240.5 g/m²) was soaked and optional percentages of pick-up, adjusted by a Mangler (a squeezing instrument), and was dried for 5 minutes at 80°C. and curing was performed for 2 minutes at 160°C. After that the cloth treated by heat was soaped by being vigorously stirred for 20 minutes at 90°C. with a liquor ratio of 50 using a water solution containing 0.25 wt. % of $Na_2CO_3$ and 0.25 wt. % Maruseru soap (product of Nippon Yushi K.K., Nissan Maruseru Soap), and further it was rinsed and dried for 15 minutes at 40°C. with a liquor ratio of 100. Then the same flame resistance tests as in Practical Example 66 were executed.

The pick-ups were 63.9 percent, 84.3 percent, 128.9 percent and 145.6 percent, the corresponding add-on percentages were, respectively, 18.0 percent, 27.3 percent, 42.8 percent and 49.6 percent. Only those cloths having add-on percentages of 42.8 percent and 49.6 percent passed the flame resistance tests. Moreover, even those having add-on percentages of 42.8 percent, when subjected to continuous washing 20 times as in Comparison Example 13, could not pass the after glow test. Also, these cloths had a very rough feel.

Comparison Example 15

A soaking liquid consisting of 30 parts of N-hydroxymethyl-3-(dimethylphosphono)propionamide:

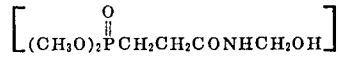

8 parts of trimethylomelamine, 1 part of urea, 0.4 part of ammonium chloride, 0.2 part of penetrant (Emulgen-810, product of Kao Atlas K.K.) 2 parts of polyethylene softening agent (Parmalin PN, product of Sanyo Kasei Kogyo K.K.) and 58.4 parts of water, was prepared.

The cotton cloth to be treated (240.5 g/m²) was soaked with optional percentages of pick-up adjusted by a Mangler (a squeezing instrument) and was dried for 5 minutes at 85°C., and curing was performed for 4.5 minutes at 160°C. After that, the cloth treated by heat was soaped by being vigorously stirred for 20 minutes at 90°C. with a liquor ratio of 50 using a water solution containing 0.25 wt. % of $Na_2CO_3$ and 0.25 wt. % of Maruseru soap (product of Nippon Yushi K.K., Nissan Maruseru Soap), and further it was rinsed and dried for 15 minutes at 40°C. with a liquor ratio of 100. Then the same flame resistance tests as in Practical Example 66 were executed.

The pick-ups were 74.6 percent, 106.7 percent, 129.3 percent, and 155.4 percent. The corresponding add-on percentages were, respectively, 18.9 percent, 27.9 percent, 27.4 percent, 34.3 percent, and 41.0 percent. Only those cloths having an add-on percentage of 34.3 percent and 41.0 percent passed the flame resistance tests. Moreover, even these, when subjected to continuous washings 20 times as in Comparison Example 13, could not pass the carbonization test. Also, these cloths had a rather rough feel.

Having now fully described the invention, it will be apparent to one of ordinary skill in the art that many changes and modifications can be made thereto without departing from the spirit or scope of the invention.

What is claimed as new and desired to be secured by Letters Patent is:

1. A method for flame proofing a fiber which comprises impregnating such fiber with a solution of an aziridinyl phosphine oxide compound selected from the group consisting of:

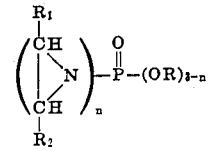

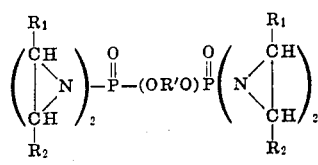

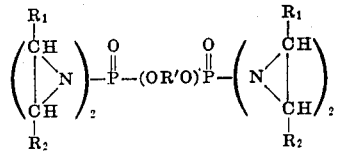

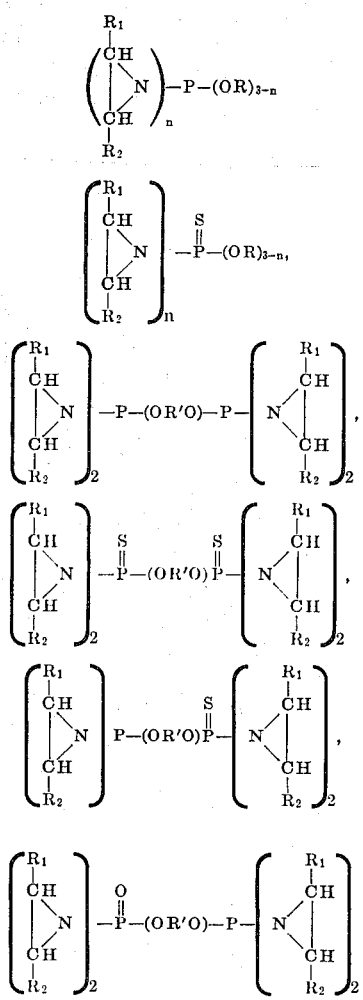

and

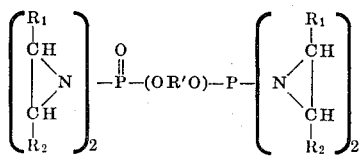

in which R represents a halogenoalkyl group or a sodium sulfonate substituted halogenoalkyl group and R' represents a halogenoalkylene group or a sodium sulfonate substituted halogenoalkyl group and $R_1$ and $R_2$ may be the same or different and each may represent hydrogen or an alkyl group, and $n$ is an integer of 1 or 2, and an acidic curing catalyst, and curing the treated fiber to fix the aziridinyl phophine oxide compound onto the fiber.

2. The flame-proofing method according to claim 1, wherein the halogens of the halogenoalkyl group and halogenoalkylene group are respectively bromine or chlorine.

3. The flame-proofing method according to claim 1, wherein said hydrogenoalkyl group contains from two to three carbon atoms and the hydrogenoalkylene group contains one to four carbon atoms.

4. The flame-proofing method according to claim 1, wherein the aziridinyl phosphine oxide compound has sodium sulfonate group and an aqueous solution of the compound is applied to the fiber.

5. The flame-proofing method according to claim 1, wherein the aziridinyl phosphine oxide compound is dissolved in a solvent and is applied to the fiber in the form of a solution.

6. The flame-proofing method according to claim 5, wherein the organic solvent is an aliphatic solvent or aromatic solvent.

7. The flame-proofing method according to claim 1, wherein the fiber treated is selected from the group consisting of cotton, rayon, hemp, silk, wool, polyvinyl alcohol, polyacrylonitrile, polyester, polyvinylchloride, polyvinylidene chloride and polyamide.

8. The flame-proofing method according to claim 1, wherein the fiber is immersed in a solution of the aziridinyl phosphine oxide compound and a curing catalyst at 0°C. to 60°C., and the pick-up rate of the solution is 50 - 98 percent by weight based on the weight of the fiber.

9. The flame-proofing method according to claim 1, wherein the concentration of the flame-proofing agent is 5 - 60 percent by weight and the concentration of the curing catalyst is 1 - 30 g/l.

10. A flame-proofing method according to claim 1, wherein the impregnated fiber is dried at 30° - 150°C. and is cured at 50° - 150°C.

11. The flame-proofing method according to claim 1, wherein said acidic curing catalyst is ammonium chloride, monobasic ammonium phosphate, dibasic ammonium phosphate, ammonium borofluoride, zinc borofluoride or zinc nitrate.

12. The flame-proofing method according to claim 1, wherein the aziridinyl phosphine oxide compound is:

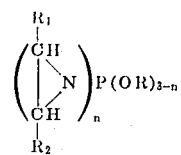

* * * * *